(12) United States Patent
Higginbotham et al.

(10) Patent No.: US 12,280,330 B2
(45) Date of Patent: Apr. 22, 2025

(54) DEHYDRATION OF CARBON DIOXIDE

(71) Applicant: Air Products and Chemicals, Inc., Allentown, PA (US)

(72) Inventors: Paul Higginbotham, Guildford (GB); Dingjun Wu, Macungie, PA (US); Gowri Krishnamurthy, Sellersville, PA (US); Todd M. Moyle, Allentown, PA (US); Michelle Roaf, Witley (GB); Mozhgan Alimohammadi Zanjani, Flemington, NJ (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 293 days.

(21) Appl. No.: 17/856,010

(22) Filed: Jul. 1, 2022

(65) Prior Publication Data
US 2024/0001282 A1  Jan. 4, 2024

(51) Int. Cl.
*B01D 53/04* (2006.01)
*B01D 53/26* (2006.01)

(52) U.S. Cl.
CPC ....... *B01D 53/0438* (2013.01); *B01D 53/265* (2013.01); *B01D 2256/22* (2013.01); *B01D 2257/80* (2013.01)

(58) Field of Classification Search
CPC .. F25J 2205/02; F25J 2205/32; F25J 2205/40; F25J 2205/60; F25J 2205/80; F25J 2210/04; F25J 2210/70; F25J 2220/80; F25J 2220/82; F25J 2230/30; F25J 2230/32; F25J 2230/80; F25J 2235/80; F25J 2245/02; F25J 2270/02; F25J 2270/80; F25J 2270/906; F25J 3/067
See application file for complete search history.

(56) References Cited

U.S. PATENT DOCUMENTS

| | | | |
|---|---|---|---|
| 7,819,951 B2 * | 10/2010 | White | C01B 32/50 95/193 |
| 8,257,476 B2 | 9/2012 | White et al. | |
| 8,900,355 B2 * | 12/2014 | White | C01B 32/50 95/227 |
| 8,931,306 B2 | 1/2015 | Buijs et al. | |
| 9,429,359 B2 | 8/2016 | Stallmann et al. | |
| 10,294,433 B2 * | 5/2019 | Grainger | C10L 3/101 |
| 10,315,150 B2 * | 6/2019 | Huntington | F25J 3/0266 |

(Continued)

FOREIGN PATENT DOCUMENTS

| | | |
|---|---|---|
| EP | 1952874 A1 | 8/2008 |
| EP | 2589908 A2 | 5/2013 |

OTHER PUBLICATIONS

CO2 Capture Technologies, "Oxy Combustion With CO2 Capture", Global CCS Institute; Jan. 2012, 16 pgs.

*Primary Examiner* — Filip Zec
(74) *Attorney, Agent, or Firm* — Jason M. Ploeger

(57) ABSTRACT

A method and system for purifying a carbon dioxide feed stream in which the carbon dioxide feed stream is cooled and partially condensed to remove water upstream of an adsorber to produce a dry carbon dioxide stream. The dry carbon dioxide stream is further cooled and partially condensed in a carbon dioxide purification unit to form a carbon dioxide product stream. Excess refrigeration duty from the carbon dioxide purification unit is used to cool the carbon dioxide feed stream.

20 Claims, 14 Drawing Sheets

(56) References Cited

U.S. PATENT DOCUMENTS

| | | | |
|---|---|---|---|
| 11,578,545 B2* | 2/2023 | Kaminsky | C10L 3/12 |
| 2009/0301132 A1* | 12/2009 | Evans | F25J 1/0052 |
| | | | 62/631 |
| 2010/0024476 A1* | 2/2010 | Shah | B01D 53/002 |
| | | | 95/41 |
| 2011/0005389 A1* | 1/2011 | Webley | B01D 53/229 |
| | | | 95/96 |

* cited by examiner

DEHYDRATION OF CARBON DIOXIDE

BACKGROUND

The present disclosure relates generally to the purification and dehydration of carbon dioxide and, more specifically, to systems and methods of integrating partial condensation and temperature swing adsorption to remove water from a carbon dioxide stream.

Existing industrial processes such as power generation will need to capture carbon dioxide ($CO_2$) to mitigate the effects of climate change. Captured $CO_2$ streams typically require removal of water and light components such as nitrogen before utilization or sequestration. In particular, water must be removed to prevent formation of a solid hydrate phase at higher pressures and/or lower temperatures.

Stallman et al. (U.S. Pat. No. 9,429,359) teach a method for drying a $CO_2$ stream by compressing and cooling the $CO_2$ stream which partially condenses to form a carbon dioxide-enriched vapor phase and an aqueous liquid phase. The carbon dioxide-enriched vapor phase is then further dehydrated using temperature swing adsorption.

Buijs et al. (U.S. Pat. No. 8,931,306) teach a method of cooling a natural gas feed prior to dehydration in which the natural gas feed is cooled against the dehydrated natural gas stream.

White et al. (U.S. Pat. No. 8,257,476) teach a method of dehydrating and purifying $CO_2$ by adsorption followed by partial condensation, also known as a $CO_2$ purification unit (CPU). The cooling duty for the CPU is provided by expanding one or more carbon dioxide-enriched streams.

The cooling duty required to cool the $CO_2$ stream requires power in some form, so there is a need in the industry to reduce the power requirements of $CO_2$ dehydration through improved heat integration.

SUMMARY

This disclosure relates to a process to dehydrate a flue gas stream to allow capture of $CO_2$ by partial condensation. The flue gas stream is first cooled to condense a portion of the water vapor present, then further dehydrated by adsorption. The resulting dry carbon dioxide stream is cooled and partially condensed to produce a carbon dioxide product stream and a vent stream depleted in $CO_2$. The purification system may be configured to produce additional refrigeration duty that may be used to cool the flue gas stream.

Aspect 1: A method for purifying a carbon dioxide feed stream comprising cooling and partially condensing the carbon dioxide feed stream to a first temperature to produce a cooled carbon dioxide stream; separating the cooled carbon dioxide stream to produce an overhead vapor stream and an aqueous bottoms stream; passing the overhead vapor stream through an online adsorber to produce a dry carbon dioxide stream and a loaded adsorber; cooling and partially condensing the dry carbon dioxide stream or a stream derived from the dry carbon dioxide stream to produce a cold carbon dioxide stream; separating the cold carbon dioxide stream to produce a cold vent stream and a cold carbon dioxide liquid stream; expanding at least a portion of the cold carbon dioxide liquid stream to produce a low-pressure carbon dioxide stream; wherein the carbon dioxide feed is cooled by one or more of at least a portion of the cold carbon dioxide liquid stream, at least a portion of the cold vent stream, and at least a portion of the low-pressure carbon dioxide stream.

Aspect 2: A method for purifying a carbon dioxide feed stream, the process comprising cooling and partially condensing the carbon dioxide feed stream to a first temperature to produce a cooled carbon dioxide stream; separating the cooled carbon dioxide stream to produce an overhead vapor stream and an aqueous bottoms stream; passing the overhead vapor stream through an online adsorber to produce a dry carbon dioxide stream and a loaded adsorber; cooling and partially condensing the dry carbon dioxide stream or a stream derived from the dry carbon dioxide stream to produce an intermediate carbon dioxide stream; separating at least a portion of the intermediate carbon dioxide stream to produce a first carbon dioxide vapor stream and a first carbon dioxide liquid stream; expanding at least a portion of the first carbon dioxide liquid stream to produce a medium-pressure carbon dioxide stream; cooling and partially condensing at least a portion of the first carbon dioxide vapor stream to produce a cold carbon dioxide stream; separating at least a portion of the cold carbon dioxide stream to produce a cold vent stream and a cold carbon dioxide liquid stream; wherein the carbon dioxide feed is cooled by one or more of at least a portion of the first carbon dioxide liquid stream, at least a portion of the medium-pressure carbon dioxide stream, at least a portion of the cold vent stream, at least a portion of the cold carbon dioxide liquid stream, and at least a portion of the low-pressure carbon dioxide stream.

Aspect 3: A method according to Aspect 2, wherein the carbon dioxide feed stream is cooled by direct contact with at least a portion of the first carbon dioxide liquid stream.

Aspect 4: A method according to any of Aspects 1 to 3, wherein the first temperature is below about 12° C.

Aspect 5: A method according to any of Aspects 1 to 4, wherein at least a portion of the cooling duty for cooling and partially condensing the carbon dioxide feed is provided by a waste heat chiller powered by a heat source.

Aspect 6: A method according to Aspect 5, further comprising compressing the low-pressure carbon dioxide stream to produce a carbon dioxide product; wherein at least a portion of the heat source is provided by the compression of the low-pressure carbon dioxide stream.

Aspect 7: A method according to Aspect 5 or Aspect 6, further comprising compressing the carbon dioxide feed stream prior to cooling and partial condensation; wherein at least a portion of the heat source is provided by the compression of the carbon dioxide feed stream.

Aspect 8: A method according to any of Aspects 5 to 7, further comprising reacting an oxygen-enriched stream with a fuel to produce the carbon dioxide feed stream; wherein at least a portion of the heat source is provided by the reaction of the oxygen-enriched stream with the fuel.

Aspect 9: A method according to any of Aspects 5 to 8, wherein at least a portion of the heat source is provided by a steam stream.

Aspect 10: A method according to any of Aspects 1 to 9, further comprising passing a regeneration gas through the loaded adsorber to regenerate the loaded adsorber and produce a spent regeneration gas; wherein the regeneration gas comprises at least 50% nitrogen.

Aspect 11: A method according to any of Aspects 1 to 10, wherein the carbon dioxide feed is cooled and partially condensed in a heat exchanger comprising a metal;

wherein a minimum temperature of the metal is greater than the hydrate formation temperature for the carbon dioxide feed stream.

Aspect 12: A method according to any of Aspects 1 to 11, further comprising compressing the low-pressure carbon dioxide stream to produce a carbon dioxide product stream;

expanding at least a portion of the carbon dioxide product stream to produce a carbon dioxide refrigerant stream; and heating the carbon dioxide refrigerant stream against the carbon dioxide feed stream.

Aspect 13: A method according to any of Aspects 1 to 12, further comprising heating the dry carbon dioxide stream by indirect heat exchange with the carbon dioxide feed stream.

Aspect 14: A method according to Aspect 13, further comprising cooling the dry carbon dioxide stream prior to heating the dry carbon dioxide stream by indirect heat exchange.

Aspect 15: A method according to any of Aspects 1 to 14, wherein the carbon dioxide feed stream is cooled by direct contact with a cold water stream.

Aspect 16: A method according to any of Aspects 1 to 15, wherein the carbon dioxide feed stream is cooled by direct contact with at least a portion of the cold carbon dioxide liquid stream.

Aspect 17: A method according to any of Aspects 1 to 16, wherein the carbon dioxide feed stream is cooled by indirect heat exchange.

Aspect 18: A system for purifying a carbon dioxide feed stream comprising a first heat exchanger configured to receive the carbon dioxide feed stream and produce a cooled carbon dioxide stream; a first separator configured to receive the cooled carbon dioxide stream and produce an overhead vapor stream and an aqueous bottoms stream; an adsorber configured to receive the overhead vapor stream and produce a dry carbon dioxide stream; a second heat exchanger configured to receive the dry carbon dioxide stream and produce a cold carbon dioxide stream; a cold separator configured to receive the cold carbon dioxide stream and produce a cold vent stream and a cold carbon dioxide liquid stream; a pressure reducer configured to receive at least a portion of the cold carbon dioxide liquid stream and produce a low-pressure carbon dioxide stream; wherein the first heat exchanger and the second heat exchanger are in fluid flow communication with one or more of at least a portion of the cold carbon dioxide liquid stream, at least a portion of the cold vent stream, and at least a portion of the low-pressure carbon dioxide stream.

Aspect 19: A system according to Aspect 18, wherein the first heat exchanger comprises a direct contact heat exchanger in fluid flow communication with a cold water stream.

Aspect 20: A system according to Aspect 18 or Aspect 19, further comprising a product compressor configured to receive the low-pressure carbon dioxide stream to produce a carbon dioxide product stream; a pressure reducer configured to receive at least a portion of the carbon dioxide product stream to produce a carbon dioxide refrigerant stream; wherein the first heat exchanger is in fluid flow communication with the carbon dioxide refrigerant stream.

Aspect 21: A system according to any of Aspects 18 to 20, wherein the first heat exchanger comprises a cold side inlet in fluid flow communication with the dry carbon dioxide stream.

Aspect 22: A system according to Aspect 21, further comprising a third heat exchanger configured to receive and cool the dry carbon dioxide stream; wherein the third heat exchanger is upstream of the cold side inlet of the first heat exchanger.

Aspect 23: A system according to any of Aspects 18 to 22, further comprising a waste heat chiller configured to receive a heat source and produce a refrigerant stream; wherein the first heat exchanger comprises a cold side inlet in fluid flow communication with the refrigerant stream.

Aspect 24: A system according to Aspect 23, further comprising a product compressor configured to receive the low-pressure carbon dioxide stream to produce a carbon dioxide product; wherein at least a portion of the heat source is provided by the product compressor.

Aspect 25: A system according to Aspect 23 or Aspect 24, further comprising a feed compressor configured to receive the carbon dioxide feed stream upstream of the first heat exchanger; wherein at least a portion of the heat source is provided by the feed compressor.

Aspect 26: A system according to any of Aspects 23 to 25, further comprising an oxyfuel combustor configured to receive an oxygen-enriched stream and a fuel and produce the carbon dioxide feed stream; wherein at least a portion of the heat source is provided by the oxyfuel combustor.

Aspect 27: A system according to any of Aspects 23 to 26, wherein at least a portion of the heat source is provided by a steam stream.

BRIEF DESCRIPTION OF THE DRAWINGS

The present invention will hereinafter be described in conjunction with the appended figures wherein like numerals denote like elements.

DETAILED DESCRIPTION

Figure 1:
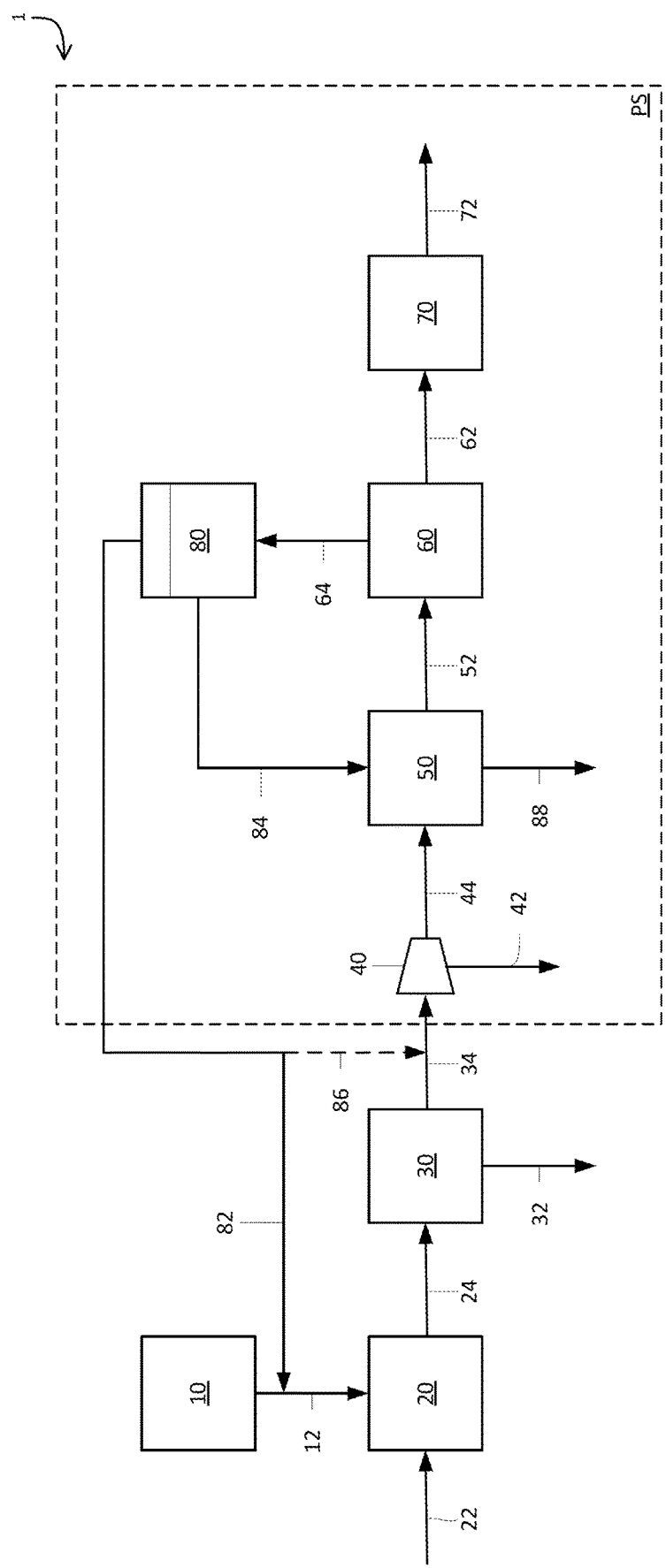
FIG. 1 is a diagram depicting an embodiment of an oxyfuel combustion process with carbon capture.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

The articles "a" or "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The phrase "at least a portion" means "a portion or all." The "at least a portion of a stream" has the same composition, with the same concentration of each of the species, as the stream from which it is derived.

The term "and/or" placed between a first entity and a second entity includes any of the meanings of (1) only the first entity, (2) only the second entity, or (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B but not C, (5) A and C but not B, (6) B and C but not A, and (7) A and B and C.

The adjective "any" means one, some, or all, indiscriminately of quantity.

The terms "depleted" or "lean" mean having a lesser mole percent concentration of the indicated component than the original stream from which it was formed. "Depleted" and "lean" do not mean that the stream is completely lacking the indicated component.

The terms "rich" or "enriched" mean having a greater mole percent concentration of the indicated component than the original stream from which it was formed.

"Downstream" and "upstream" refer to the intended flow direction of the process fluid transferred. If the intended flow direction of the process fluid is from the first device to the second device, the second device is downstream of the first device. In case of a recycle stream, downstream and upstream refer to the first pass of the process fluid.

The term "indirect heat exchange" refers to the process of transferring sensible heat and/or latent heat between two or more fluids without the fluids in question coming into physical contact with one another. The heat may be transferred through the wall of a heat exchanger or with the use of an intermediate heat transfer fluid. The term "hot stream" refers to any stream that exits the heat exchanger at a lower temperature than it entered. Conversely, a "cold stream" is one that exits the heat exchanger at a higher temperature than it entered. A hot stream enters on a hot side inlet of the heat exchanger and a cold stream enters on a cold side inlet of the heat exchanger. A heat exchanger may have any number of hot side inlets and cold side inlets.

FIG. 1 shows an embodiment of a process 1 for oxyfuel combustion with carbon capture. An oxygen plant 10 produces an oxygen-enriched stream 12 which is combusted with fuel 22 in oxyfuel combustor 20 to produce heat and a flue gas 24. "Oxygen-enriched" is defined as any composition greater than the ambient concentration of 21% by volume. The oxyfuel combustor may be associated with any industrial process requiring heat such as power generation, lime production, and cement production. In at least some embodiments, the flue gas 24 comprises carbon dioxide generated by the reaction of a feedstock such as limestone due to the heat generated by the oxyfuel combustor. If necessary, particulate matter 32 may be removed from the flue gas 24 in particulate removal system 30, leaving a carbon dioxide feed stream 34. The carbon dioxide feed stream 34 then enters the purification section PS. If required, the carbon dioxide feed stream 34 may be compressed in compression system 40. The compression system 40 may comprise multiple stages of compression and may also comprise interstage coolers and/or aftercoolers. The compression and cooling may result in the formation of a condensate phase 42 which may comprise nitrogen and sulfur containing species due to dissolved NOx and SOx. The compressed carbon dioxide feed stream 44 enters a dehydration system 50 in which water is removed to form a dry carbon dioxide stream 52. The concentration of water in the dry carbon dioxide stream 52 may be below 5 ppm, below 3 ppm, or below 1 ppm, so that the dry carbon dioxide stream 52 may be cooled further without forming an ice and/or hydrate phase. The dry carbon dioxide stream 52 is then cooled and partially condensed in carbon dioxide purification unit 60. The carbon dioxide purification unit 60 separates the dry carbon dioxide stream 52 into a vent stream 64 and a purified carbon dioxide stream 62. In at least some embodiments, the purified carbon dioxide stream 62 may then enter final purification system 70 to produce a carbon dioxide product stream 72. Depending on the end use of sequestration or utilization, and/or on the transportation requirements, the final purification system 70 may comprise one or more of liquefaction, trace impurity removal such as oxygen and/or sulfur removal, dehydration, and compression.

In at least some embodiments, the vent stream 64 may be separated in a membrane separation system 80 which may comprise a single membrane stage or a plurality of membrane stages in series and/or parallel. The vent stream 64 is separated by selective permeation into a carbon dioxide-enriched permeate stream 82 and a carbon dioxide-lean retentate stream 84. Carbon dioxide selectively permeates the membrane over slower species such as nitrogen. In at least some example implementations, the higher solubility of carbon dioxide in the membrane material results in a faster permeation rate than similar-sized molecules with lower solubility such as nitrogen.

Sanders et al (Polymer; vol 54; pp 4729-4761; 2013) provide a convenient summary of current membrane technology. They describe the physical parameters and performance characteristics of polymeric membranes including polystyrene, polysulfone, polyethersulfone, polyvinyl fluoride, polyvinylidene fluoride, polyether ether ketone, polycarbonate, polyphenylene oxide, polyethylene, polypropylene, cellulose acetate, polyimide (such as Matrimid 5218 or P-84), polyamide, polyvinyl alcohol, polyvinyl acetate, polyethylene oxide, polydimethylsiloxane, copolymers, block copolymers, or polymer blends. Existing industrially useful gas separations are performed primarily with polymers such as those listed above or rubbery materials such as silicone. Additional membrane materials may comprise mixed-matrix membranes, perfluoropolymers, thermally rearranged polymers, facilitated transport membranes, metal-organic frameworks, zeolitic-imidazolate frameworks, electrochemical membranes, metallic membranes, and carbon molecular sieves. The membrane material in the membrane separation system 80 can be any of those listed above, or any other material that has a faster permeation rate for some compounds such as carbon dioxide and a slower permeation rate for some compounds such as nitrogen.

Suitable membrane materials may be manufactured as hollow fibers and packaged as membrane bundles, or may be manufactured as flat sheets, packaged as spiral-wound or plate-and-frame units, in order to provide a larger surface area to volume ratio, and housed in a module. Gas entering the module contacts the membrane, and a fraction of the gas permeates through the membrane and leaves the module in the lower-pressure permeate stream. The faster permeating gases will be enriched in the permeate relative to the slower permeating gases. The fraction of the gas that does not permeate through the membrane leaves the module in the non-permeate, or retentate, stream which is enriched in the slower permeating gases relative to the faster permeating gases. A membrane stage is defined as one or more membrane modules arranged so that each feed inlet is in fluid flow communication with one another, each permeate outlet is in fluid flow communication with one another, and each retentate outlet is in fluid flow communication with one another.

The carbon dioxide-enriched permeate stream 82 may be recycled by combining with the oxygen-enriched stream 12 and/or the carbon dioxide feed stream 34 via line 86. In at least some embodiments, the dehydration system 50 comprises an adsorption system. The carbon dioxide-depleted retentate stream 84 may be used to regenerate the adsorption system, producing a spent regeneration stream 88 that may be recycled or vented. In at least some embodiments, the adsorption system may be regenerated with at least a portion of the vent stream 64, compressed dry air, and/or an inert gas such as nitrogen. In at least some embodiments, the vent stream 64 and the carbon dioxide-depleted retentate stream 84 comprise at least 50% nitrogen by volume.

Figure 2:
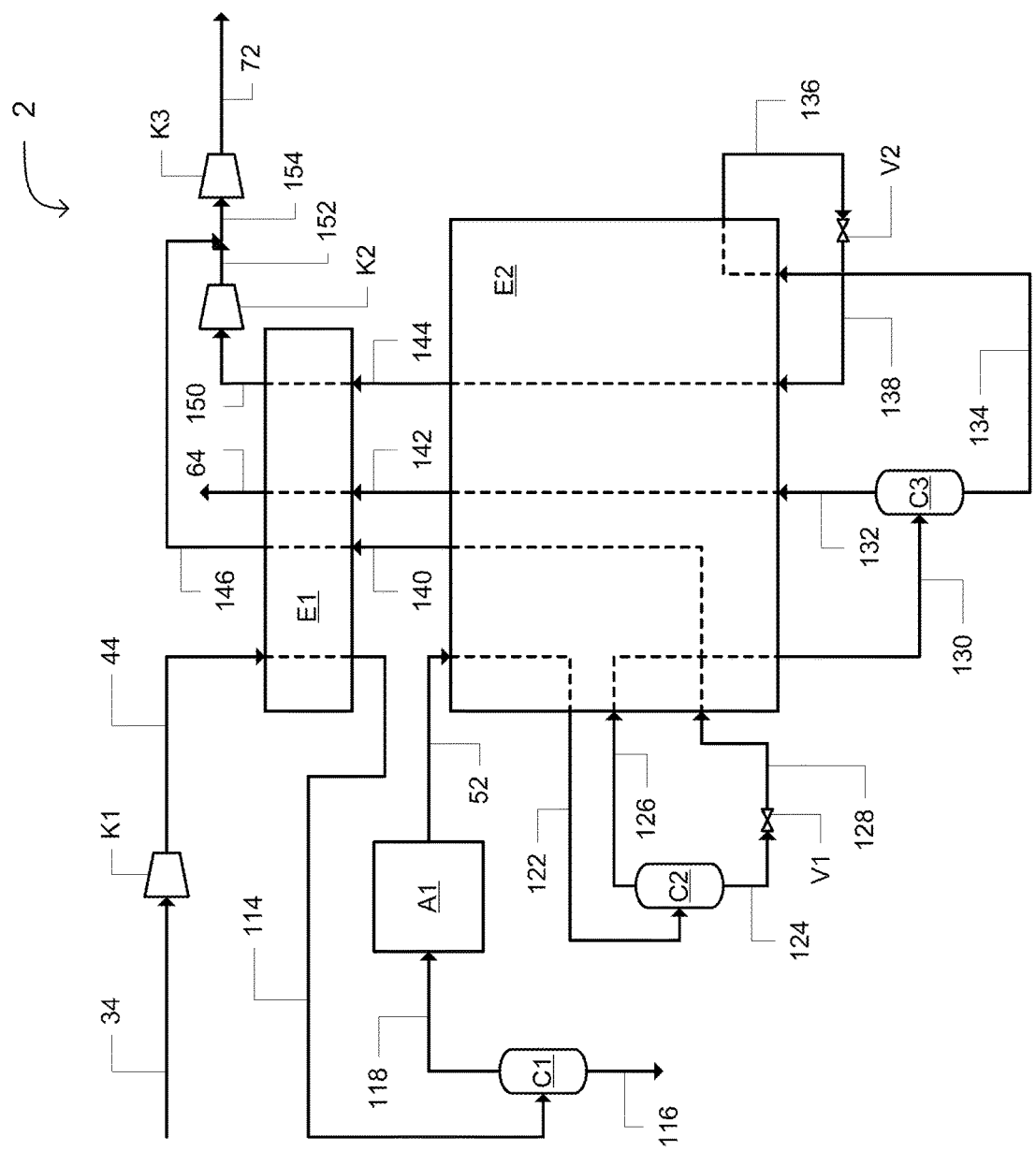
FIG. 2 is a diagram depicting a detailed flow sheet of a CO2 purification system.

FIG. 2 shows an embodiment of a process 2 that shows the purification section PS in greater detail. In at least some embodiments, the carbon dioxide feed stream 34 is compressed in feed compressor K1. The compressed carbon dioxide feed stream 44 is cooled and at least partially condensed in first heat exchanger E1 to produce cooled carbon dioxide stream 114. The cooled carbon dioxide stream 114 is separated in first separator C1 to produce an aqueous bottoms stream 116 and an overhead vapor stream 118. The overhead vapor stream 118 is passed through an online adsorber A1 that removes water and allows a dry carbon dioxide stream 52 to exit. The online adsorber A1 may utilize one or more high surface area adsorbents, including but not limited to zeolites, metal-organic frameworks (MOF), alumina, silica gel, silicalites, activated carbon, Engelhard titanosilicate (ETS), and metal oxides.

The dry carbon dioxide stream 52 is cooled and partially condensed in second heat exchanger E2 to produce an intermediate carbon dioxide stream 122. The intermediate carbon dioxide stream 122 is separated in intermediate separator C2 to produce a first carbon dioxide liquid stream 124 and a first carbon dioxide vapor stream 126. The first carbon dioxide liquid stream 124 is then expanded across a pressure reducer such as valve V1 to produce a medium-pressure carbon dioxide stream 128 which provides refrigeration to the second heat exchanger E2.

The first heat exchanger E1 and the second heat exchanger E2 represent a heat exchanger system that can be a single heat exchanger or be split into two or more heat exchangers in series or parallel. For example, the second heat exchanger E2 may be divided into two separate heat exchangers between where intermediate carbon dioxide stream 122 exits and where first carbon dioxide vapor stream 126 enters.

The first carbon dioxide vapor stream 126 is further cooled and partially condensed in second heat exchanger E2 to produce a cold carbon dioxide stream 130. The cold carbon dioxide stream 130 is then separated in cold separator C3, which may comprise a flash vessel and/or a column comprising trays and/or packing, to produce a cold vent stream 132 and a cold carbon dioxide liquid stream 134. The cold vent stream 132 provides refrigeration to the second heat exchanger E2. The cold carbon dioxide liquid stream 134 may optionally be warmed in the second heat exchanger E2 before being expanded across a pressure reducer such as valve V2 to produce a low-pressure carbon dioxide stream 138 which provides refrigeration to the second heat exchanger E2. The second heat exchanger E2, intermediate separator C2, and cold separator C3 form the CPU.

The medium-pressure carbon dioxide stream 128, the cold vent stream 132, and the low-pressure carbon dioxide stream 138 exit the second heat exhanger E2 as cool medium-pressure carbon dioxide stream 140, cool vent stream 142, and cool low-pressure carbon dioxide stream 144, respectively. The cool medium-pressure carbon dioxide stream 140, cool vent stream 142, and cool low-pressure carbon dioxide stream 144 provide refrigeration to first heat exchanger E1 which cools the compressed carbon dioxide feed stream 112, exiting the first heat exchanger as warm medium-pressure carbon dioxide stream 146, vent stream 64, and warm low-pressure carbon dioxide stream 150, respectively. For embodiments in which the first heat exchanger E1 and the second heat exchanger E2 are combined into a single heat exchanger, the medium-pressure carbon dioxide stream 128, the cold vent stream 132, and the low-pressure carbon dioxide stream 138 provide refrigeration to cool the compressed carbon dioxide feed stream 112, the dry carbon dioxide stream 52, and the first carbon dioxide vapor stream 126.

In at least some embodiments, the medium-pressure carbon dioxide stream 128, the cold vent stream 132, and the low-pressure carbon dioxide stream 138 are cold enough to provide refrigeration to both the dry carbon dioxide stream 52 and the compressed carbon dioxide feed stream 44. This is surprising because in a typical auto-refrigerated CPU process, the cold streams would only have enough refrigeration to partially condense the dry carbon dioxide stream 52. However, in the present disclosure, the overhead vapor stream 118 that feeds the online adsorber A1 has had a significant fraction of water removed in the first separator C1. This in turn reduces the amount of water adsorbed by the online adsorber A1, and because adsorption is an exothermic process, the temperature increase across the online adsorber is reduced. As a result the dry carbon dioxide stream 52 exits the online adsorber at a lower temperature than would be expected, requiring less refrigeration duty in the second heat exchanger E2. The excess refrigeration duty offered by the cold streams can therefore be used to cool the compressed carbon dioxide feed stream 44 without requiring expanding the cold carbon dioxide liquid stream 134 to lower pressures which would increase the amount of refrigeration available at the cost of higher overall power demand.

The warm low-pressure carbon dioxide stream 150 is compressed in first product compressor K2 and combined with warm medium-pressure carbon dioxide stream 146 to form a combined carbon dioxide product stream 154, which in turn is compressed in second product compressor K3 to form a carbon dioxide product stream 72. The carbon dioxide product stream 72 may also be formed by a single, multistage product compressor in which the warm low-pressure carbon dioxide stream 150 enters the feed stage and the warm medium-pressure carbon dioxide stream 146 enters an intermediate stage.

Figure 3:
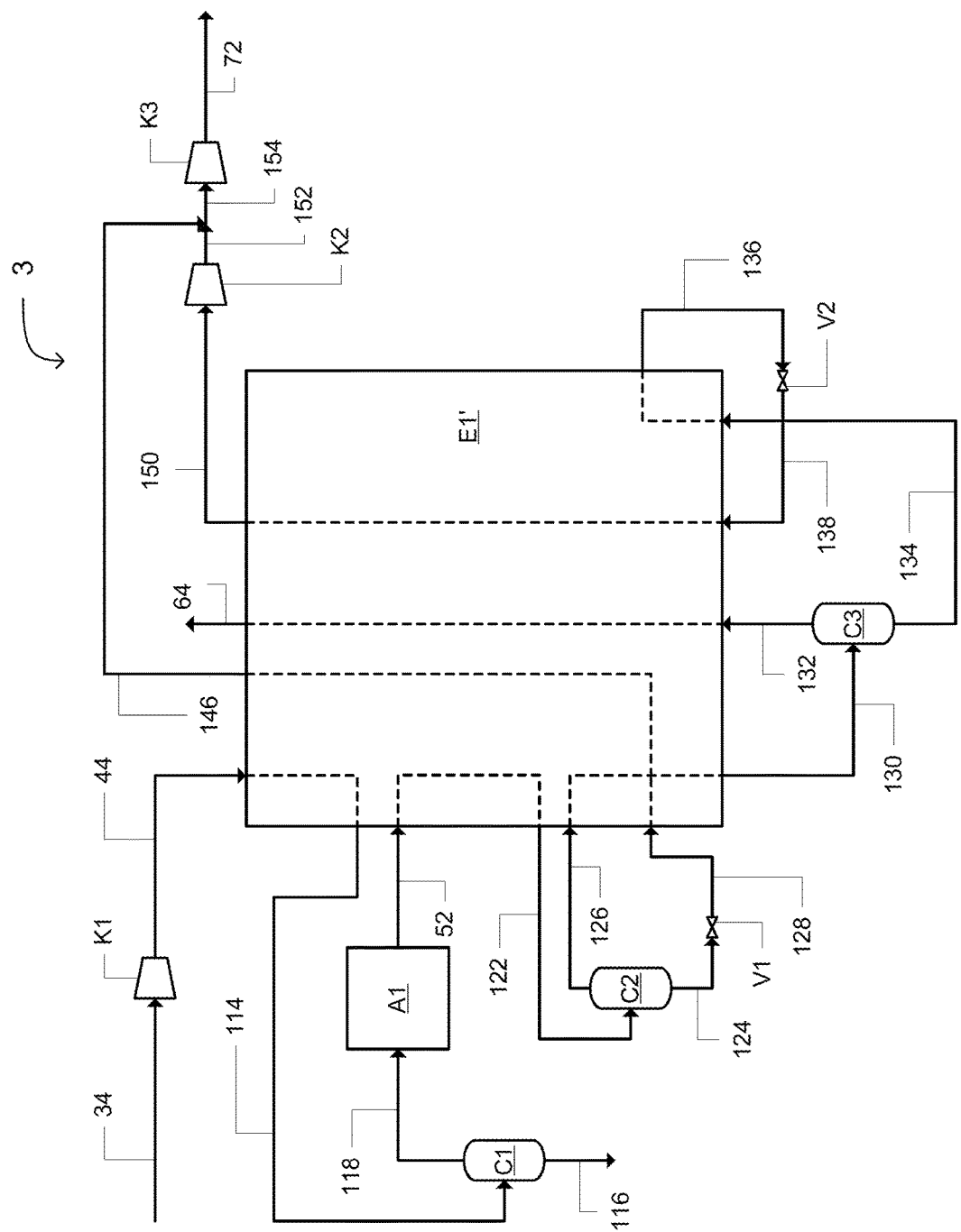
FIG. 3 is a diagram depicting a modification of FIG. 2 in which a single combined heat exchanger is used to cool and partially condense a carbon dioxide feed stream.

FIG. 3 shows an embodiment of a process 3 in which the first heat exchanger E1 and second heat exchanger E2 of process 2 are combined to form combined heat exchanger E1'. Cooled carbon dioxide stream 114 is withdrawn from the combined heat exchanger E1' and the dry carbon dioxide stream 52 is returned to the combined heat exchanger E1'. The medium-pressure carbon dioxide stream 128, cold vent stream 132, and low-pressure carbon dioxide stream 138 are heated in the combined heat exchanger E1' to produce the warm medium-pressure carbon dioxide stream 146, the vent stream 64, and warm low-pressure carbon dioxide stream 150, respectively.

Figure 4:
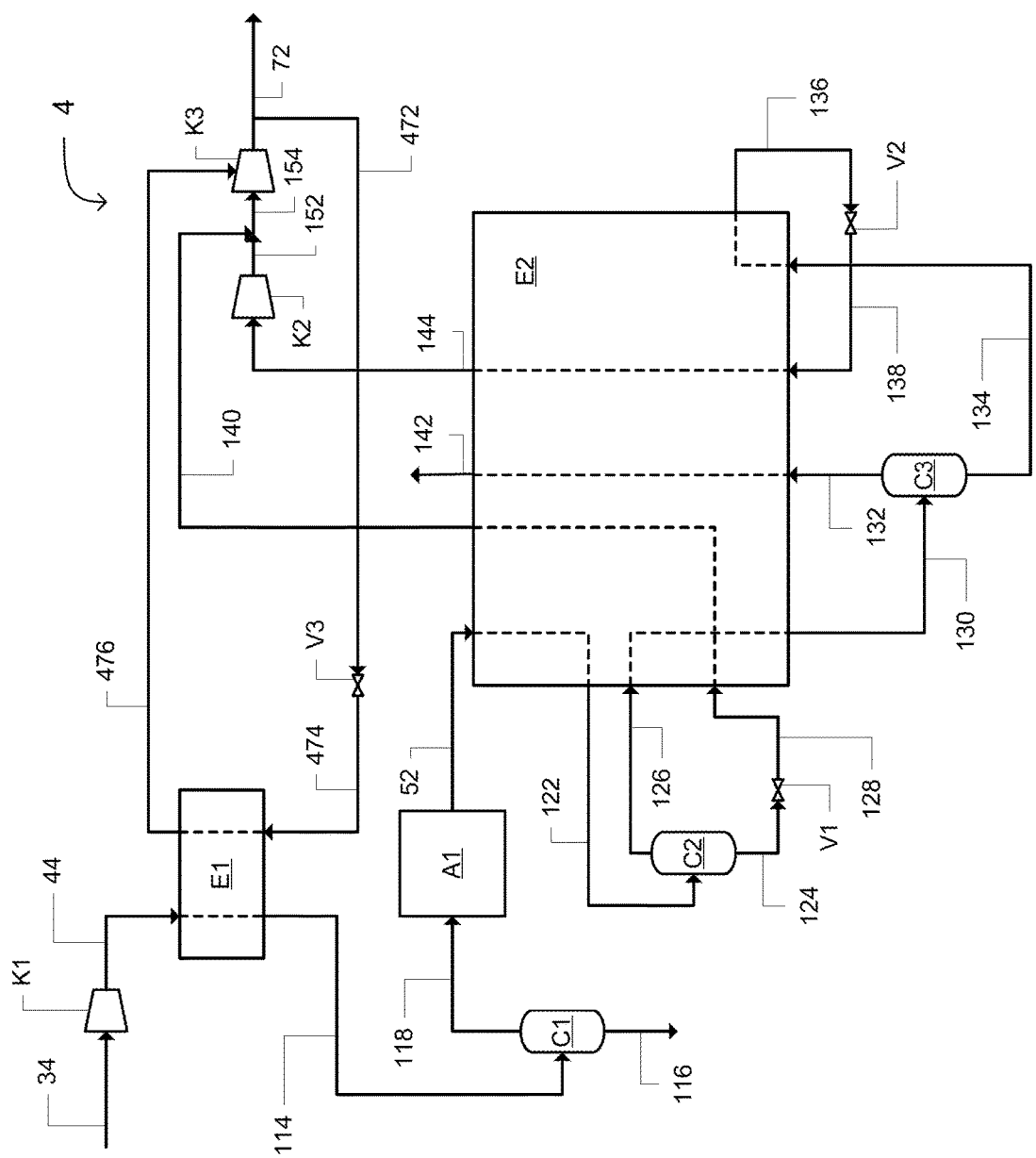
FIG. 4 is a diagram depicting a modification of FIG. 2 in which a portion of a carbon dioxide product is expanded to provide refrigeration to cool a compressed carbon dioxide feed stream.

FIG. 4 shows an embodiment of a process 4 which uses a portion of the carbon dioxide product stream 72 as a refrigerant. A portion of the carbon dioxide product stream 72 is divided to form high-pressure return stream 472, then expanded across valve V3 to produce a product carbon dioxide refrigerant stream 474. The product carbon dioxide refrigerant stream 474 is heated by indirect heat exchange against the compressed carbon dioxide stream 44 in first heat exchanger E1. In at least some embodiments, the warm product carbon dioxide refrigerant stream 476 is then compressed in second product compressor K3. A person of skill in the art will appreciate that the pressure of the carbon dioxide refrigerant stream 474 may be selected to balance the refrigeration needs of the first heat exchanger E1 with the suction pressure of the product compressor the warm carbon dioxide refrigerant stream 476 may be returned to.

In at least some embodiments, cool low-pressure carbon dioxide stream 144 is withdrawn from second heat exchanger E2 and compressed in first product compressor K2, and cool medium-pressure carbon dioxide stream 140 is withdrawn from second heat exchanger E2 and compressed in second product compressor K3. Compressing the cool streams improves overall compressor efficiency, balancing the increased volumetric flow through the product compressors due to the returning warm product carbon dioxide refrigerant. Cool vent stream 142 may be used as refrigeration in E1 or may be sent directly to the membrane separation system 80. For some membrane materials carbon dioxide separation is improved at lower temperatures due to higher solubility of $CO_2$ in the membrane.

Figure 5:
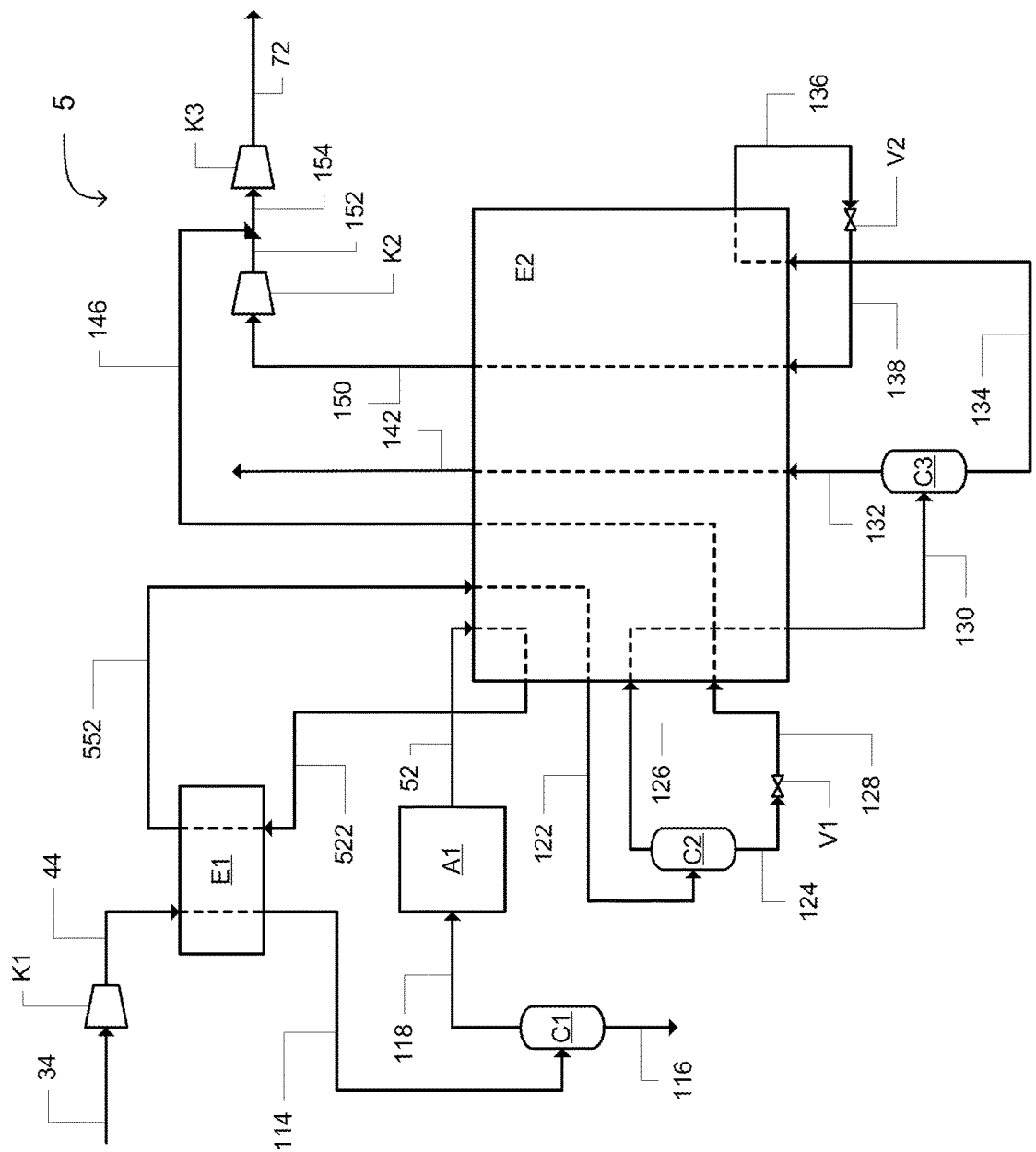
FIG. 5 is a diagram depicting a modification of FIG. 4 in which a dry carbon dioxide stream provides refrigeration to cool the compressed carbon dioxide feed stream.

FIG. 5 shows a modification of FIG. 4 in which the first heat exchanger is refrigerated by the dry carbon dioxide stream 52 leaving the online adsorber A1. The dry carbon dioxide stream 52 is cooled in second heat exchanger E2 to produce a dry carbon dioxide refrigerant stream 522 at a cold enough temperature to provide refrigeration to first heat exchanger E1. The warm dry carbon dioxide refrigerant stream 552 leaves first heat exchanger E1 and enters second heat exchanger E2 to be cooled and partially condensed to produce the intermediate carbon dioxide stream 122 as in process 2 in FIG. 2.

Because the second heat exchanger E2 must provide refrigeration duty to both the dry carbon dioxide stream 52 and the warm dry carbon dioxide refrigerant stream 552, the medium-pressure carbon dioxide stream 128, cold vent stream 132, and low-pressure carbon dioxide stream 138 are heated in the second heat exchanger E2 to produce the warm medium-pressure carbon dioxide stream 146, the vent stream 64, and warm low-pressure carbon dioxide stream 150.

Figure 6:
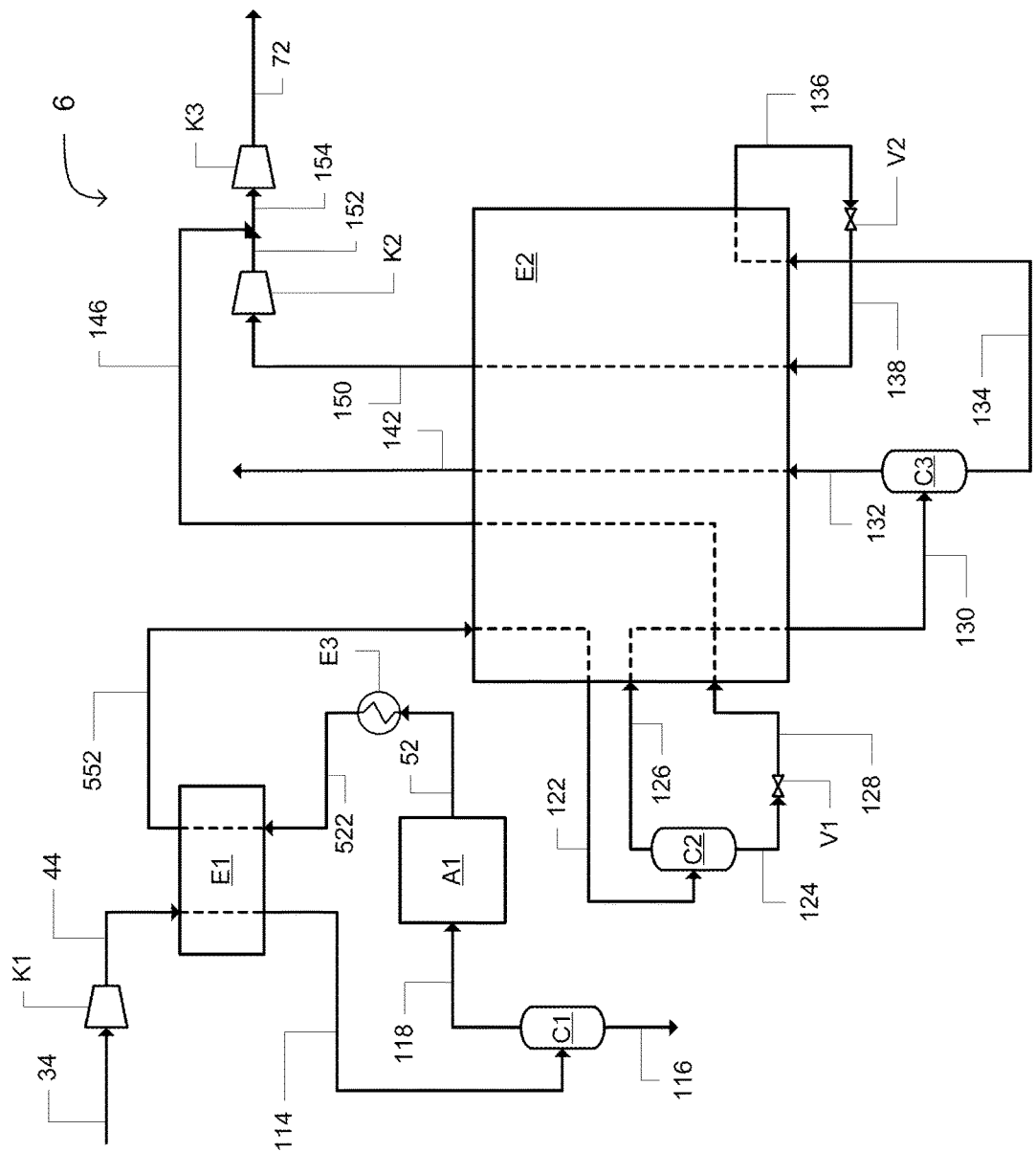
FIG. 6 is a diagram depicting a modification of FIG. 5 in which the dry carbon dioxide stream is cooled prior to providing refrigeration.

FIG. 6 shows a modification of FIG. 5 in which the dry carbon dioxide stream 52 is cooled by a chiller E3 to produce the dry carbon dioxide refrigerant stream 522. The chiller E3 may be any type of chiller designed to reach temperatures below ambient. In at least some embodiments the chiller E3 may comprise a waste heat chiller such as an absorption chiller or adsorption chiller. In the simplest form, a waste heat chiller boils a refrigerant to provide cooling. The vaporized refrigerant is absorbed or adsorbed, then regenerated by using low-grade waste heat to liberate the refrigerant which can then be condensed. Askalany et al. (Renewable and Sustainable Energy Reviews, 16:493-500, 2012) and Srikhirin et al. (Renewable and Sustainable Energy Reviews, 5:343-372, 2001) describe adsorbtion and absorption chillers, respectively. The source of low-grade heat may be the oxyfuel combustor 20, the feed compressor K1, the first product compressor K2, and/or the second product compressor K3. In at least some embodiments the source of low-grade heat may be provided by steam.

Figure 7:
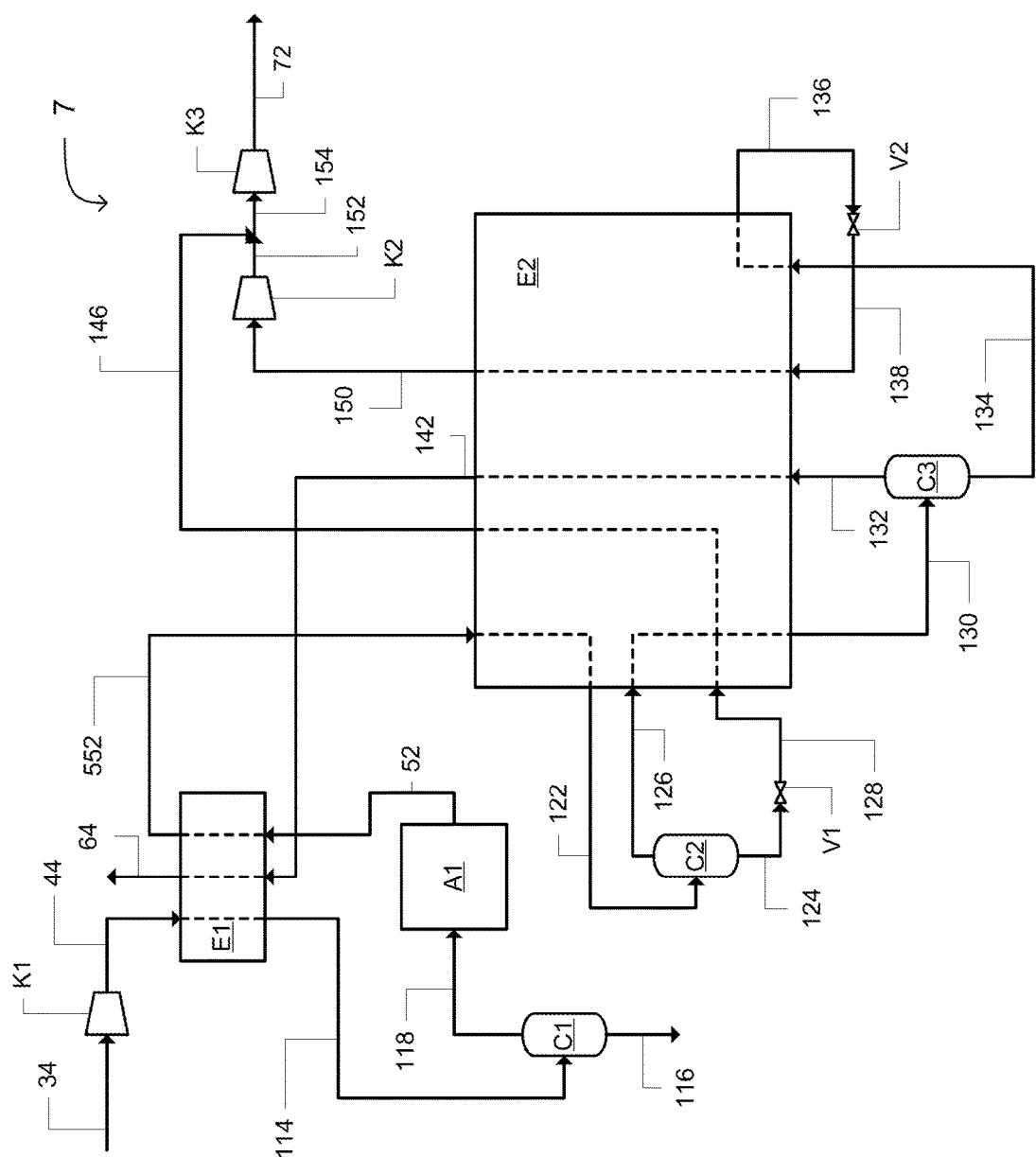
FIG. 7 is a diagram depicting a modification of FIG. 5 in which a cool vent stream provides refrigeration to cool the compressed carbon dioxide feed stream.

FIG. 7 shows a modification of FIG. 6 in which the cool vent stream 142 provides additional refrigeration to first heat exchanger E1. In at least some embodiments, the additional refrigeration provided by the cool vent stream 142 eliminates the need for the chiller E3.

Figure 8:
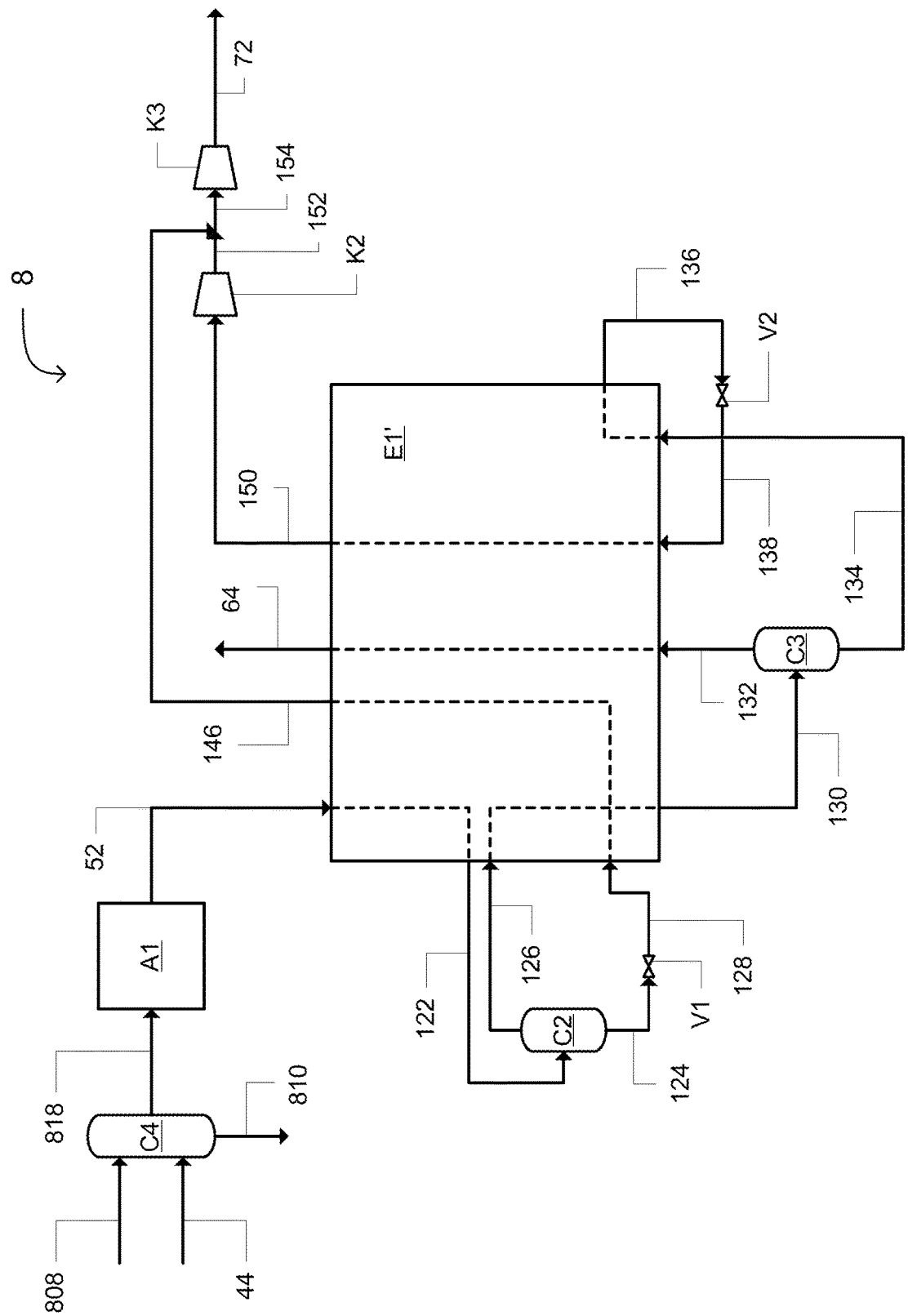
FIG. 8 is a diagram depicting a modification of FIG. 3 in which a compressed carbon dioxide feed stream is combined with a cold water stream to cool and partially condense water.

FIG. 8 shows a process 8 in which the compressed carbon dioxide feed stream 44 cooled by contacting with a cold water stream 808. The temperature of the cold water stream 808 may be maintained above the temperature of hydrate formation. In at least some embodiments the compressed carbon dioxide feed stream 44 is contacted with the cold water stream 808 in a column C4 that comprises packing or trays to improve gas-liquid contact. The spent water stream 810 exits column C4 and may be recycled and/or treated. The cooled compressed carbon dioxide feed stream 818 passes through the online adsorber A1 to be dehydrated as in FIG. 2. Note that although the cooled compressed carbon dioxide feed stream 818 is saturated with water vapor, the temperature of the stream has been lowered so as to achieve a similar degree of dehydration as in the first separator C1 in FIG. 2.

Figure 9:
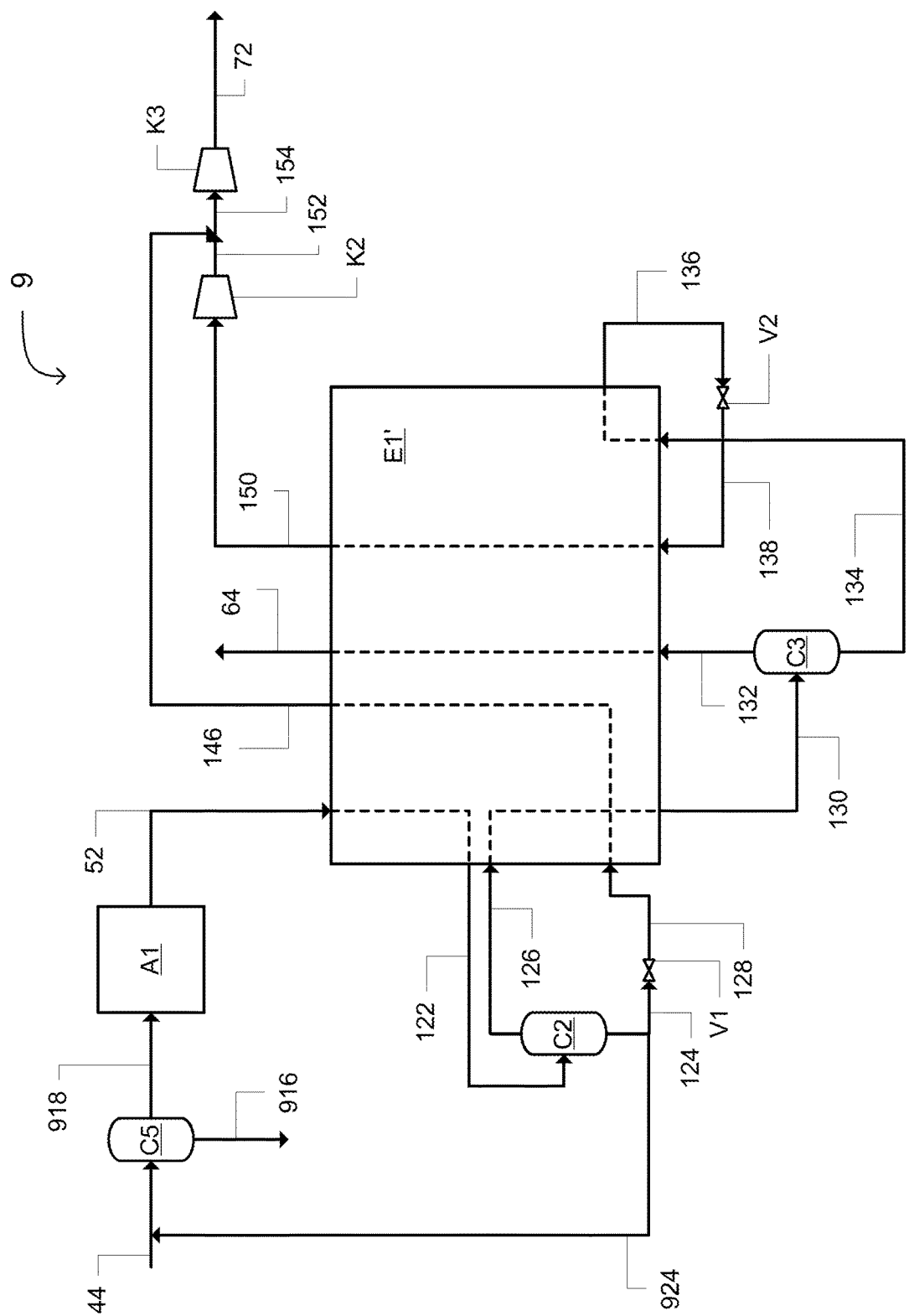
FIG. 9 is a diagram depicting a modification of FIG. 8 in which the compressed carbon dioxide feed stream is combined with a liquid carbon dioxide stream.

FIG. 9 shows a modification of FIG. 8 in which the compressed carbon dioxide feed stream 44 is cooled by combining with a liquid carbon dioxide recycle stream 924. In at least some embodiments the liquid carbon dioxide recycle stream 924 may be formed by dividing a portion of the first carbon dioxide liquid stream 124. If required, the liquid carbon dioxide recycle stream 924 may be pumped. The combined stream is separated in separator C5 to produce an aqueous bottoms stream 916 and an overhead vapor stream 918.

Figure 10:
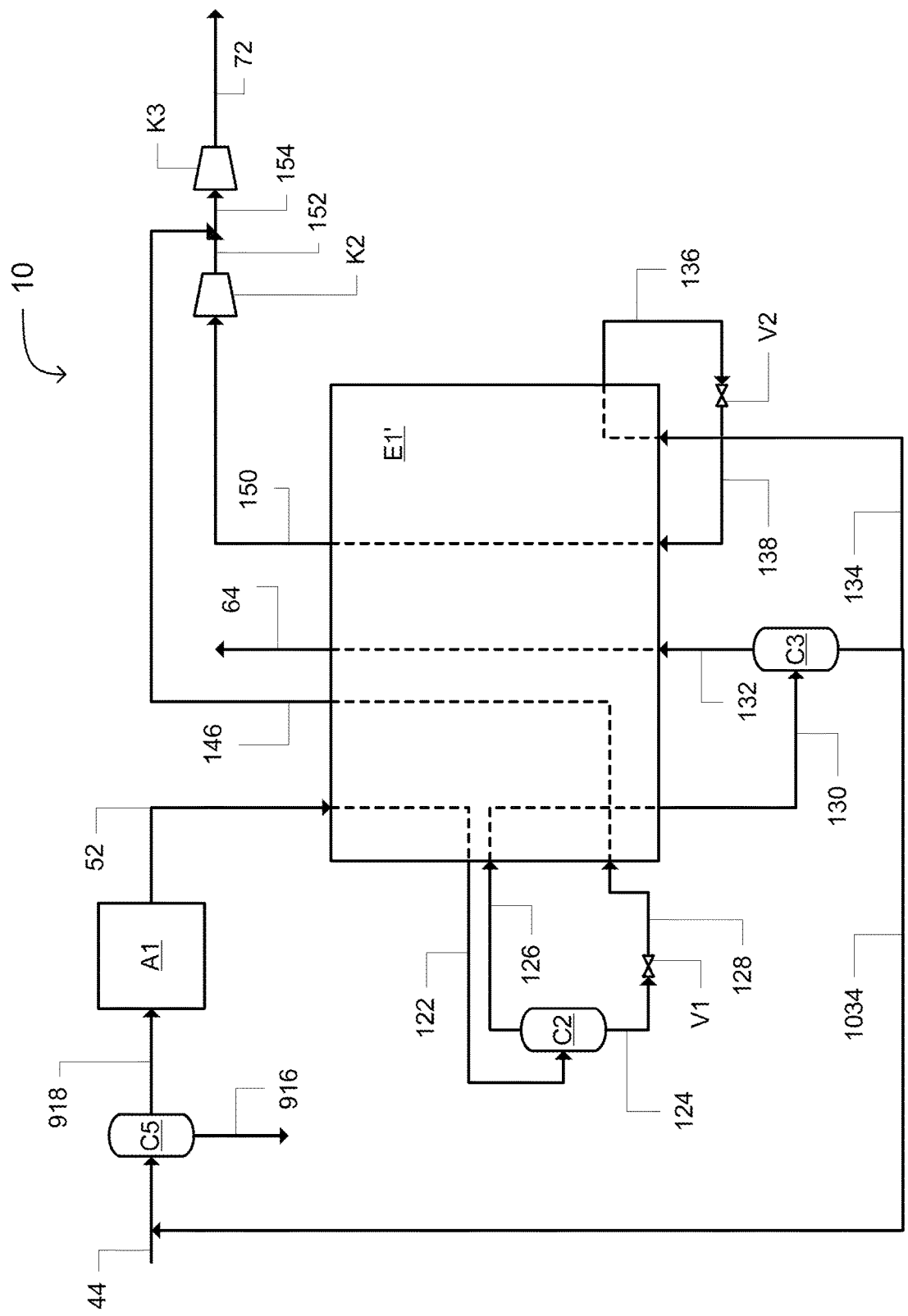
FIG. 10 is a diagram depicting a modification of FIG. 9 in which the liquid carbon dioxide stream is obtained from a cold end of the CO2 purification system.

FIG. 10 shows a modification of FIG. 9 in which a liquid carbon dioxide recycle stream 1034 is formed by dividing a portion of the second carbon dioxide liquid stream 134. If required, the liquid carbon dioxide recycle stream 1034 may be pumped.

Figure 11:
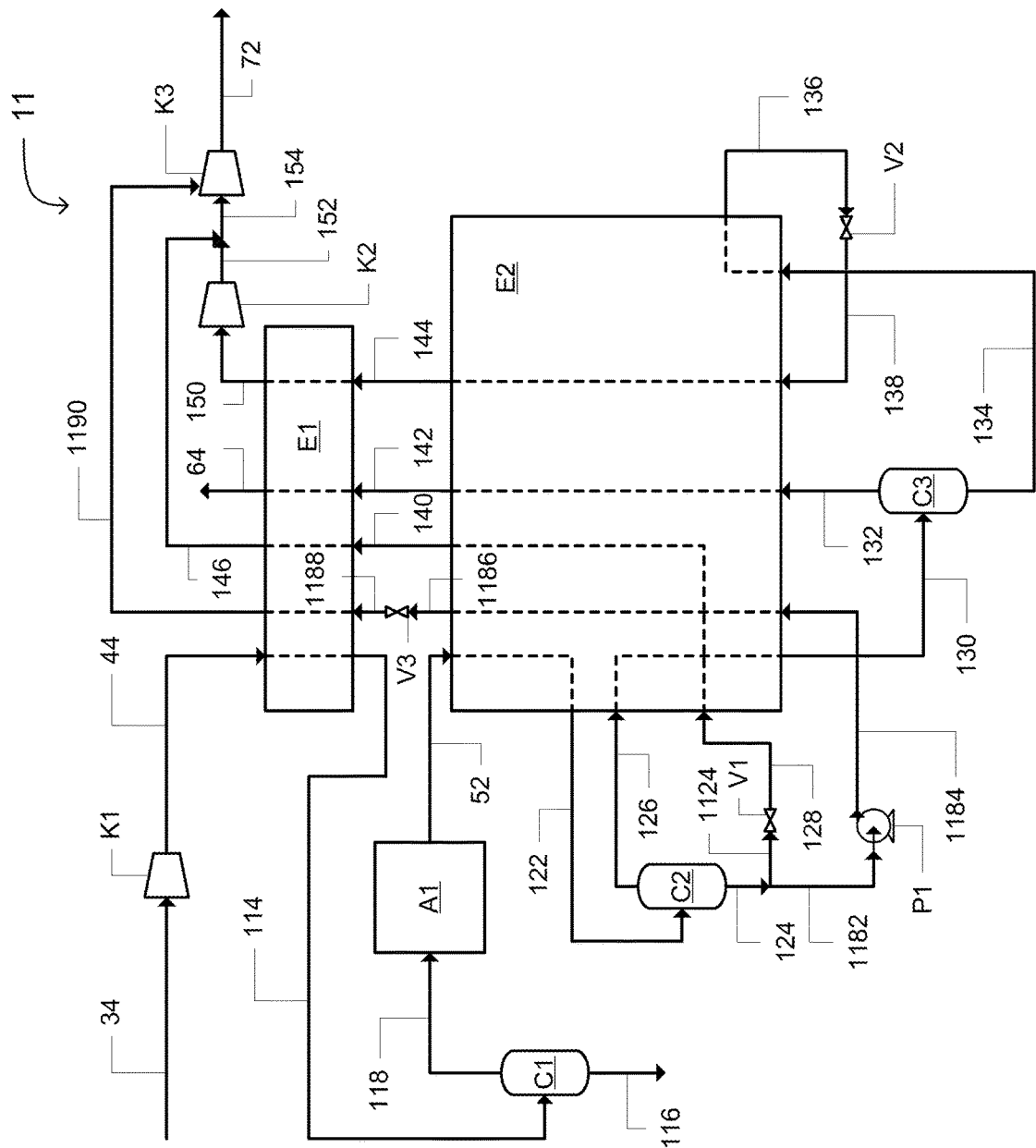
FIG. 11 is a diagram depicting a modification of FIG. 2 in which a portion of the first carbon dioxide liquid stream is pumped and used as a refrigerant.

FIG. 11 shows a modification of FIG. 2 in which the first carbon dioxide liquid stream 124 is divided to form a first carbon dioxide liquid fraction 1124 and a second carbon dioxide liquid fraction 1182. The first carbon dioxide liquid fraction 1124 is expanded across valve V1 to form produce a medium-pressure carbon dioxide stream 128 which provides refrigeration to the second heat exchanger E2 as in FIG. 2. The second carbon dioxide liquid fraction 1182 is pumped in pump P1 to produce a pumped second carbon dioxide liquid fraction 1184 which is heated in second heat exchanger E2 to produce a cool second carbon dioxide liquid fraction 1186. The cool second carbon dioxide liquid fraction 1186 is expanded across valve V3 to produce an expanded second carbon dioxide liquid fraction 1188. The expanded second carbon dioxide liquid fraction 1188 may then provide refrigeration to the first heat exchanger E1 to produce a warm second carbon dioxide liquid fraction 1190. Depending on the pressure of the warm second carbon dioxide liquid fraction 1190, it may be combined with the warm low-pressure carbon dioxide stream 150, fed to the feed stage or interstage of first product compressor K2, combined with the warm medium-pressure carbon dioxide stream 146, or fed to the feed stage or interstage of second product compressor K3.

Figure 12:
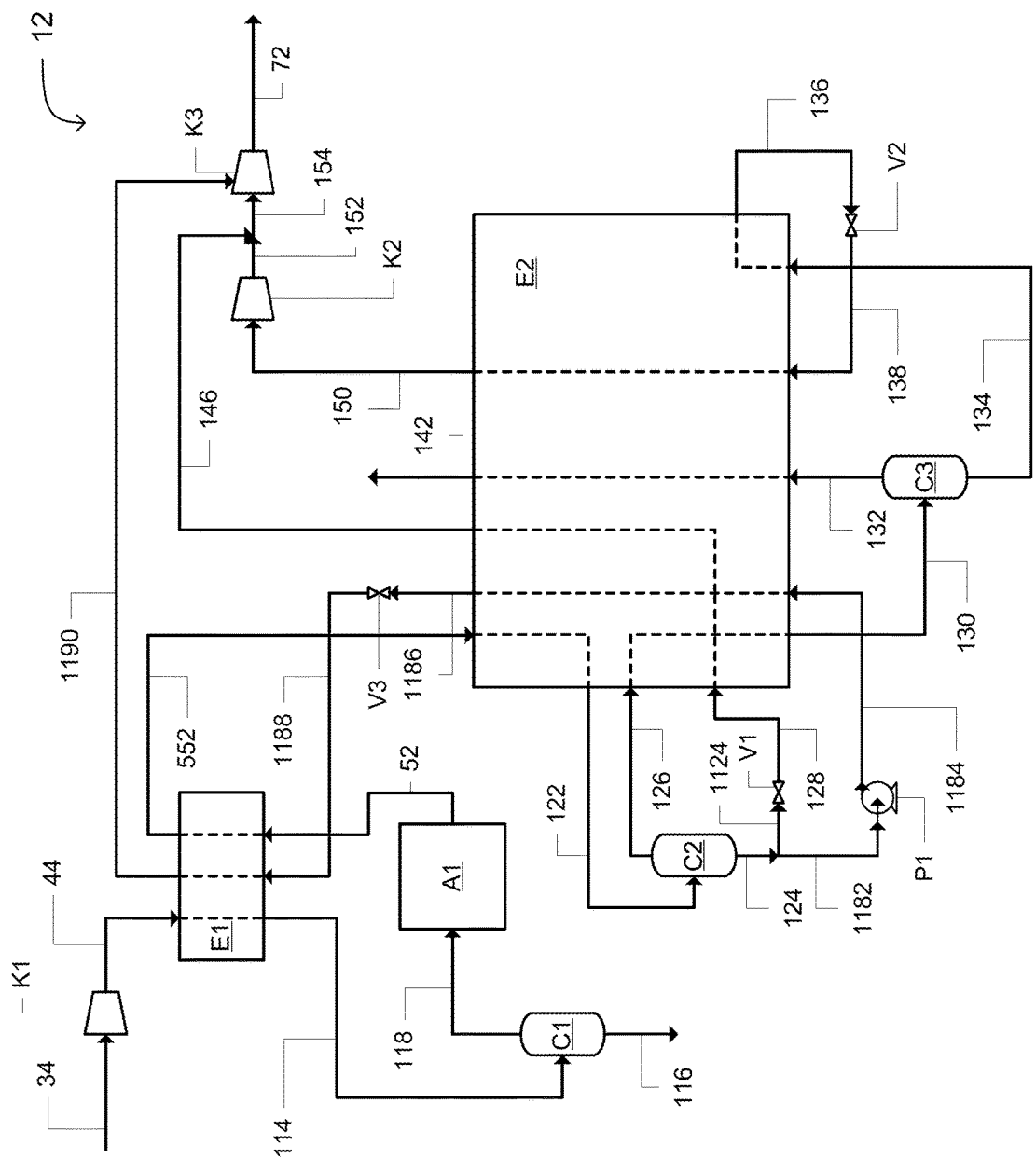
FIG. 12 is a diagram depicting a modification of FIG. 7 in which a portion of the first carbon dioxide liquid stream is pumped and used as a refrigerant.

FIG. 12 shows a modification of FIG. 7 in which the first carbon dioxide liquid stream 124 is divided as in FIG. 11. The expanded second carbon dioxide liquid fraction 1188 provides refrigeration to the first heat exchanger E1 which allows the cool vent stream 142 to be vented or separated in a membrane separation system at a lower temperature which allows a higher selectivity for carbon dioxide over slow gases such as nitrogen for most membrane materials.

Figure 13:
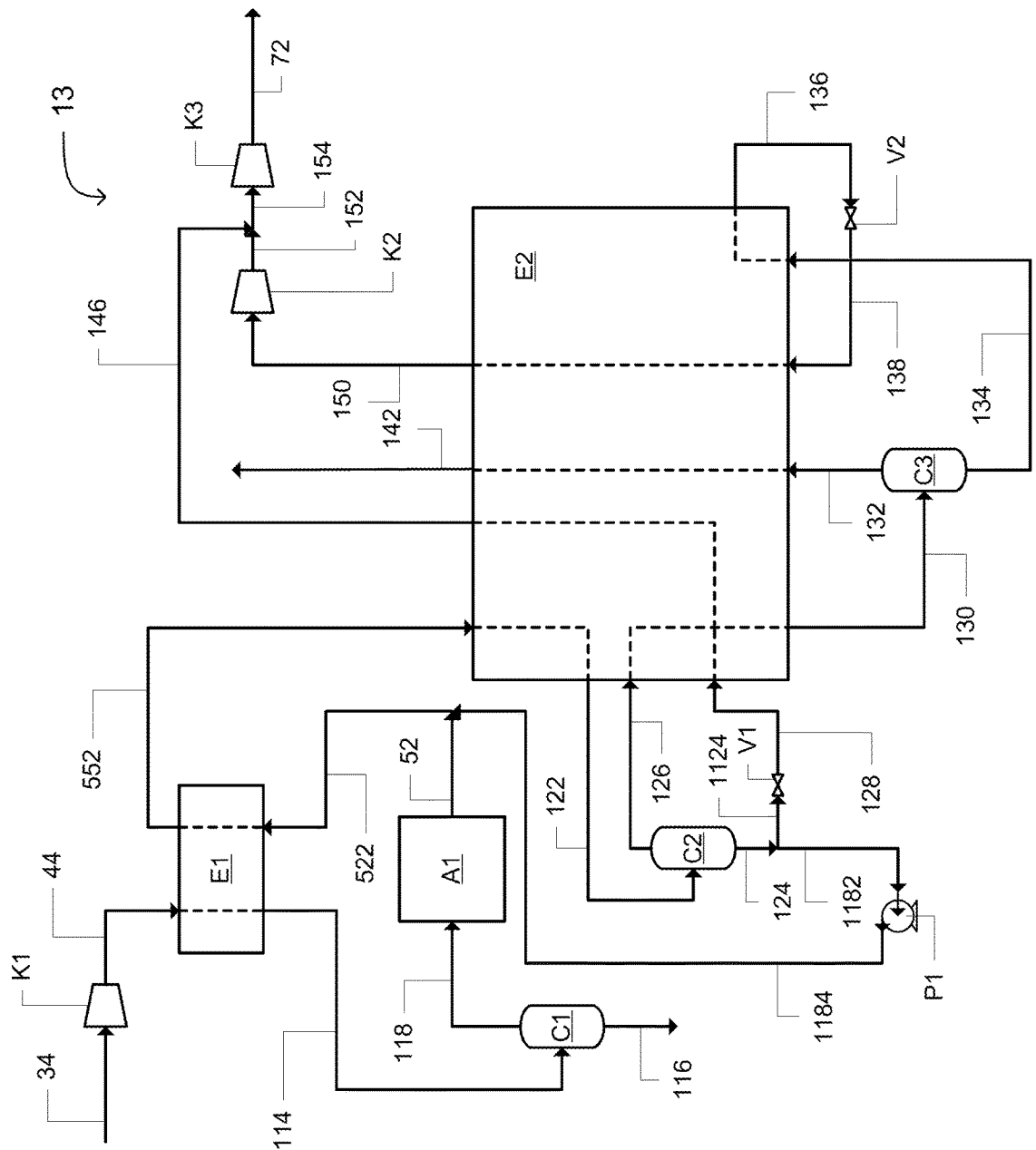
FIG. 13 is a diagram depicting a modification of FIG. 6 in which a portion of the first carbon dioxide liquid stream is pumped and used as a refrigerant.

FIG. 13 shows a modification of FIG. 6 in which the first carbon dioxide liquid stream 124 is divided as in FIG. 11. The pumped second carbon dioxide liquid fraction 1184 is combined directly with the dry carbon dioxide stream 52 to produce the dry carbon dioxide refrigerant stream 522. The colder pumped second carbon dioxide liquid fraction 1184 may allow the elimination of the chiller E3 in at least some embodiments.

Figure 14:
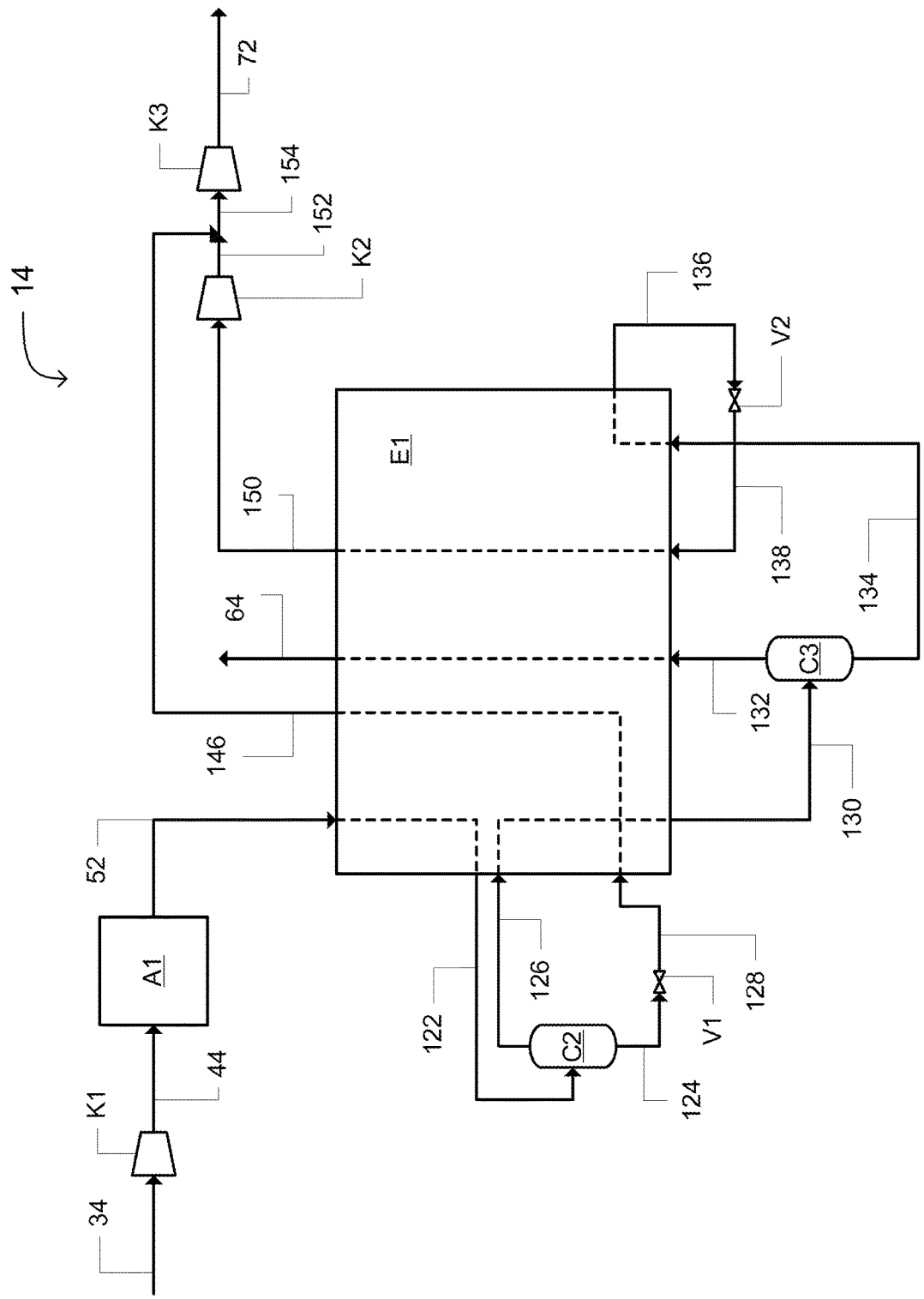
FIG. 14 is a diagram depicting a modification of FIG. 2 in which the carbon dioxide feed stream is not cooled prior to dehydration.

FIG. 14 shows a comparative example in which the feed to the online adsorber A1 is not cooled.

Example 1

Computer simulations of the process of FIG. 2 and the process of FIG. 14 were compared using Aspen Plus® process simulation software, available from Aspen Technology Inc. In both cases compressed carbon dioxide stream 44 is saturated with water vapor at 33° C. and 29.6 bar. All pressures listed are absolute. The effect of chilling the feed to the online adsorber A1 can be seen in Table 1. In FIG. 2, the feed to the online adsorber A1 is overhead vapor stream 118 is 12° C. and holds much less water than the compressed carbon dioxide stream 44 that enters the online adsorber A1 in FIG. 14. In FIG. 2 this first stage of dehydration before the TSA reduces the temperature increase in the online adsorber A1 by more than two-thirds, which in turn decreases the amount of refrigeration needed in the CPU. Overall, the power is 0.2% lower in the chilled TSA feed case of FIG. 2. More heat exchanger surface area is needed in FIG. 2 due to the additional paths through the heat exchanger compared to FIG. 14.

TABLE 1

| | FIG. 14 | FIG. 2 |
|---|---|---|
| Temperature entering A1 (° C.) | 33 | 12 |
| Molar fraction H2O entering A1 | 0.020051 | 0.000713 |

TABLE 1-continued

| | FIG. 14 | FIG. 2 |
|---|---|---|
| Temperature exiting A1 (° C.) | 35.9 | 12.9 |
| Temperature increase in A1 | 2.9 | 0.9 |
| Normalized overall power | 100.0% | 99.8% |
| Normalized total HX area | 100.0% | 101.7% |

Example 2

Computer simulations of the process of FIG. 2 and the process of FIG. 4 were compared using Aspen Plus software. The compressed carbon dioxide stream 44 is at the same conditions as Example 1. FIG. 4 chills the feed to the online adsorber A1 using a product carbon dioxide refrigerant stream 474. Expanding a portion of the product carbon dioxide and then recompressing it increases the overall power by 2.6% compared to FIG. 2, although the total heat exchanger area is 1.4% lower than FIG. 2. Using refrigeration from the CPU saves on operating costs for a small increase in heat exchanger area.

Example 3

Computer simulations of the process of FIG. 2 and the process of FIG. 6 were compared using Aspen Plus software. The compressed carbon dioxide stream 44 is at the same conditions as Example 1. The hot and cold streams entering and exiting first heat exchanger E1 are compared in Table 2. It can be seen that the cold stream in FIG. 6 enter the first heat exchanger E1 at a higher temperature than the cold streams in FIG. 2. Thus FIG. 6 has a narrower cooling curve in which the temperatures of the hot and cold streams are closer, reducing the risk of freezing carbon dioxide and/or formation of solid carbon dioxide hydrates on the metal surface of the first heat exchanger E1.

The cooling duty for the chiller E3 is 465 kW. This can easily be provided by a waste heat chiller driven by heat generated by the second product compressor K3. In at least some embodiments, waste heat chillers require heat at temperatures above 130° C. and have a coefficient of performance ranging from 0.7 to 2.0. The coefficient of performance is defined as the ratio of the cooling duty provided by the waste heat chiller to the heating duty provided to the waste heat chiller. In the case of FIG. 6, there is more than one order of magnitude more heating duty available above 130° C., allowing for external refrigeration to be provided by compression required by the process.

TABLE 2

| FIG. 2 | 44 | 114 | 140 | 146 | 142 | 64 | 144 | 150 |
|---|---|---|---|---|---|---|---|---|
| Flow rate (kmol/h) | 1000 | 1000 | 699 | 699 | 196 | 196 | 84 | 84 |
| T (° C.) | 33.0 | 12.0 | 1.6 | 26.5 | 1.6 | 26.5 | 1.6 | 26.5 |
| FIG. 6 | | 44 | 114.0 | | 52 | | 522 | 552 |
| Flow rate (kmol/h) | | 1000 | 1000 | | 996 | | 996 | 996 |
| T (° C.) | | 33.0 | 12.0 | | 13.4 | | 7.0 | 29.5 |
| Cooling duty E3 (kW) | 465 | | | | | | | |
| Aftercooler duty K3 to 130° C. (kW) | 4800 | | | | | | | |

Example 4

A computer simulation of the process of FIG. 8 was carried out using Aspen Plus software. The compressed carbon dioxide stream 44 is at the same conditions as Example 1, and combined with cold water stream 808 at 10° C. and 30 bar. The cold water stream 808 is saturated with carbon dioxide to reflect the recycle of the water stream after contacting with the compressed carbon dioxide stream 44. The cooled compressed carbon dioxide feed stream 818 exits the column C4 at 12° C. and 29.6 bar with 710 ppmv water, similar to the overhead vapor stream 118 in FIG. 2 in Examples 1 and 2.

While the principles of the invention have been described above in connection with preferred embodiments, it is to be clearly understood that this description is made only by way of example and not as a limitation of the scope of the invention.

The invention claimed is:

1. A method for purifying a carbon dioxide feed stream comprising:
   cooling and partially condensing the carbon dioxide feed stream to a first temperature to produce a cooled carbon dioxide stream comprising a vapor fraction and an aqueous liquid fraction;
   separating the cooled carbon dioxide stream to produce an overhead vapor stream and an aqueous bottoms stream;
   passing the overhead vapor stream through an online adsorber to produce a dry carbon dioxide stream and a loaded adsorber;
   cooling and partially condensing the dry carbon dioxide stream or a stream derived from the dry carbon dioxide stream to produce a cold carbon dioxide stream;
   separating the cold carbon dioxide stream to produce a cold vent stream and a cold carbon dioxide liquid stream;
   expanding at least a portion of the cold carbon dioxide liquid stream to produce a low-pressure carbon dioxide stream;
   wherein the carbon dioxide feed is cooled by one or more of at least a portion of the cold carbon dioxide liquid stream, at least a portion of the cold vent stream, and at least a portion of the low-pressure carbon dioxide stream.

2. The method of claim 1, wherein the first temperature is above about 12° C.

3. The method of claim 1, wherein at least a portion of the cooling duty for cooling and partially condensing the carbon dioxide feed is provided by a waste heat chiller powered by a heat source.

4. The method of claim 3, further comprising:
   compressing the carbon dioxide feed stream prior to cooling and partial condensation; and
   compressing the low-pressure carbon dioxide stream to produce a carbon dioxide product;
   wherein at least a portion of the heat source is provided by at least one of the compression of the carbon dioxide feed stream and the compression of the low-pressure carbon dioxide stream.

5. The method of claim 3, further comprising reacting an oxygen-enriched stream with a fuel to produce the carbon dioxide feed stream;
   wherein at least a portion of the heat source is provided by the reaction of the oxygen-enriched stream with the fuel.

6. The method of claim 1, wherein the carbon dioxide feed is cooled and partially condensed in a heat exchanger comprising a metal;
   wherein a minimum temperature of the metal is greater than the hydrate formation temperature for the carbon dioxide feed stream.

7. The method of claim 1, further comprising compressing the low-pressure carbon dioxide stream to produce a carbon dioxide product stream;
   expanding at least a portion of the carbon dioxide product stream to produce a carbon dioxide refrigerant stream; and
   heating the carbon dioxide refrigerant stream against the carbon dioxide feed stream.

8. The method of claim 1, further comprising heating the dry carbon dioxide stream by indirect heat exchange with the carbon dioxide feed stream.

9. The method of claim 8, further comprising cooling the dry carbon dioxide stream prior to heating the dry carbon dioxide stream by indirect heat exchange.

10. The method of claim 1, wherein the carbon dioxide feed stream is cooled by direct contact with a cold water stream.

11. The method of claim 1, wherein the carbon dioxide feed stream is cooled by direct contact with at least a portion of the cold carbon dioxide liquid stream.

12. The method of claim 1, wherein the carbon dioxide feed stream is cooled by indirect heat exchange.

13. A system for purifying a carbon dioxide feed stream comprising:
   a first heat exchanger configured to receive the carbon dioxide feed stream and produce a cooled carbon dioxide stream comprising a vapor fraction and an aqueous liquid fraction;
   a first separator configured to receive the cooled carbon dioxide stream and produce an overhead vapor stream and an aqueous bottoms stream;
   an adsorber configured to receive the overhead vapor stream and produce a dry carbon dioxide stream;
   a second heat exchanger configured to receive the dry carbon dioxide stream and produce a cold carbon dioxide stream;
   a cold separator configured to receive the cold carbon dioxide stream and produce a cold vent stream and a cold carbon dioxide liquid stream;
   a pressure reducer configured to receive at least a portion of the cold carbon dioxide liquid stream and produce a low-pressure carbon dioxide stream;
   wherein the first heat exchanger and the second heat exchanger are in fluid flow communication with one or more of at least a portion of the cold carbon dioxide liquid stream, at least a portion of the cold vent stream, and at least a portion of the low-pressure carbon dioxide stream.

14. The system of claim 13, wherein the first heat exchanger comprises a direct contact heat exchanger in fluid flow communication with a cold water stream.

15. The system of claim 13, further comprising a product compressor configured to receive the low-pressure carbon dioxide stream to produce a carbon dioxide product stream;
   a pressure reducer configured to receive at least a portion of the carbon dioxide product stream to produce a carbon dioxide refrigerant stream;
   wherein the first heat exchanger is in fluid flow communication with the carbon dioxide refrigerant stream.

16. The system of claim 13, wherein the first heat exchanger comprises a cold side inlet in fluid flow communication with the dry carbon dioxide stream.

17. The system of claim 16, further comprising a third heat exchanger configured to receive and cool the dry carbon dioxide stream; wherein the third heat exchanger is upstream of the cold side inlet of the first heat exchanger.

18. The system of claim 13, further comprising a waste heat chiller configured to receive a heat source and produce a refrigerant stream;
   wherein the first heat exchanger comprises a cold side inlet in fluid flow communication with the refrigerant stream.

19. The system of claim 18, further comprising:
   a feed compressor configured to receive the carbon dioxide feed stream upstream of the first heat exchanger; and
   a product compressor configured to receive the low-pressure carbon dioxide stream to produce a carbon dioxide product;
   wherein at least a portion of the heat source is provided by at least one of the feed compressor and the product compressor.

20. The system of claim 18, further comprising an oxyfuel combustor configured to receive an oxygen-enriched stream and a fuel and produce the carbon dioxide feed stream;
   wherein at least a portion of the heat source is provided by the oxyfuel combustor.

* * * * *